E. F. MENKIN.
OLIVE AND PICKLE FORK.
APPLICATION FILED FEB. 7, 1908.
914,060.
Patented Mar. 2, 1909.
  
  
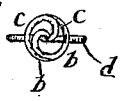
Witnesses:
Oscar W. Bond
Wm. P. Bond
Inventor:
Edward F. Menkin
THE NORRIS PETERS CO., WASHINGTON, D. C.

UNITED STATES PATENT OFFICE.

EDWARD F. MENKIN, OF CHICAGO, ILLINOIS.

OLIVE AND PICKLE FORK.

No. 914,060.　　　Specification of Letters Patent.　　　Patented March 2, 1909.

Application filed February 7, 1908. Serial No. 414,811.

*To all whom it may concern:*

Be it known that I, EDWARD F. MENKIN, a citizen of the United States, residing at Chicago, in the county of Cook, in the State of Illinois, have invented a certain new and useful Improvement in Olive and Pickle Forks, of which the following is a specification.

The removal of olives and other round or spherical articles such as pickled onions, cherries and similar fruits or vegetables from jars or receptacles containing the same, and, particularly, one at a time, is attended with more or less difficulty and inconvenience owing to the shape of the articles, which, by reason of sliding or slipping away, makes it impossible to readily grasp or spear the article with an ordinary straight tine fork.

The present invention relates to forks, especially adapted and intended for use in removing, one at a time, olives, onions, cherries, pickled or otherwise and other fruits and vegetables having a round or spherical body, and put up in jars or receptacles and have such removal performed without any particular trouble and inconvenience in grasping the article.

The objects of the invention are to construct an olive and pickle fork having a stem and an acting end with the acting end provided with a double hookgrab, for entering and grasping the body of the olive or pickle or, other round article and holding the same firmly for withdrawal from the jar or receptacle; to construct an olive and pickle fork, formed into shape, to have a twisted stem and two hook grabs each outwardly and spirally curved and their entering points brought inwardly toward and across each other and having the stem and hook grabs integral: and to improve generally the construction, formation and operation, of olive and pickle forks.

The invention consists in the features of construction and combinations of parts hereinafter described and pointed out in the claims.

In the drawing, illustrating the invention: Figure 1 is an elevation of the fork complete in one form of construction and made from a single piece of wire. Fig. 2, an end view of the acting end of the fork of Fig. 1; Fig. 3, a detail in elevation showing a modified construction for the upper end of the stem of the fork of Fig. 1; and Fig. 4, an elevation of a complete fork, made from a strip of metal to furnish a stem and two hook grabs for engaging with and holding the caught article.

The fork in the construction shown in Figs. 1, 2 and 3, is made from a single piece of wire of the length required to be turned on itself and form the stem and the hook grabs of the completed fork. The two parts or strands of the wire are twisted together to furnish a single twisted strand, constituting the stem or body $a$ of the fork. The unjoined or separate ends of the two parts or strands of the wire when turned on itself are each made into a hook grab, one end forming the hook grab $b$ and the other end forming the hook grab $c$, each of which is of a spiral or cork-screw shape, first curving outwardly and downwardly and then so as to cross each other inwardly as shown in Figs. 1 and 2; and the terminal end of each hook grab as shown is pointed or sharpened so as to readily enter the olive or other article. The pointed ends cross each other and are separated somewhat, so that one hook grab will act as a rest or bearing to initially enter the opposite hook grab as the fork is turned and finally enter both hook grabs into the article, and have both hook grabs grasp and hold firmly the caught article.

The joined or continuous end of the parts or strand as shown in Fig. 1 at the non-acting end of the fork are formed into a finger loop or eye $d$ to facilitate handling the fork in use; as shown in Fig. 4, the non-acting end is made into an elongated loop $e$, and inclosed in a covering $f$ of metal or other material to form a handle for use in operating the fork.

The fork, as a whole, instead of being made from a single piece of wire, as in the construction of Figs. 1, 2 and 3, can be made from a strip of metal and such form of construction is shown in Fig. 4, in which the body or stem $a'$ is narrower than the holding end as shown. The acting end is formed by splitting or dividing the body for a short distance longitudinally so as to form two pieces; and each piece is turned and curved to form the hook grabs, one end or piece forming the hook grab $b'$ and the other end or piece forming the hook grab $c'$, each of which is of a spiral or cork-screw formation with the entering ends crossing each other as described for the hook grabs $b$ and $c$ of wire. The ends of the hook grabs $b'$ and $c'$ cross each other and are also pointed or sharpened, and these hook grabs operate the same as described for the hook grabs $b$ and $c$ of wire. The upper or non-acting end is wider than the body and forms a finger piece d' to facilitate handling the fork in use.

In use the fork is inserted in the mouth or neck of the bottle or receptacle and one of the grab hooks is made to bear on the surface of the olive, onion, cherry or other article, and serve as a fulcrum for entering the grab hooks into the article: and when entered, the grab hooks crossing each other at their points will grasp the body of the article and firmly hold the same on the end of the fork and against dropping off in withdrawing the article from the bottle or receptacle; and after the article has been withdrawn, it can be easily and quickly removed by giving the fork a reverse movement.

What I claim as new and desire to secure by Letters-Patent is:—

1. An olive and pickle fork consisting of a stem and an acting end, the acting end having a pair of grab-hooks, outwardly and spirally curved for entering the body of the article to be withdrawn, substantially as described.

2. An olive and pickle fork consisting of a stem and an acting end, the acting end having a pair of crossing grab-hooks, each grab hook having an outwardly downwardly and inwardly spiral curve for entering the body of the article to be withdrawn, substantially as described.

3. An olive and pickle fork consisting of a stem, formed by twisting together two strips or strands of metal and an acting end having a grab-hook at the terminal end of each strip or strand of the stem, each grab-hook outwardly and downwardly curved spirally for the acting end to enter and grasp the body of the article, substantially as described.

4. An olive and pickle fork made from a single piece of wire turned on itself to furnish two strands and having the two strands twisted together to form a stem and having the free end of each strand shaped to form a spirally outwardly downwardly and inwardly turned grab-hook, the hooks crossing each other at their terminal ends, for the hooks to constitute an acting end for entering and grasping the body of the article to be withdrawn, substantially as described.

5. An olive and pickle fork made from a single piece of wire turned on itself to furnish two strands and having the two strands twisted together to form a stem, and having the free end of each strand outwardly curved to form a hook-grab, the two hook-grabs constituting the acting end of the fork for entering and grasping the body of the article to be withdrawn, substantially as described.

EDWARD F. MENKIN.

Witnesses:
 OSCAR W. BOND,
 PAULINE BERKSON.